March 13, 1962 A. G. W. HALL 3,025,193
MOULDING OF BOAT HULLS FROM SYNTHETIC
RESIN BONDED GLASS FIBRES
Filed Feb. 20, 1957 6 Sheets-Sheet 1

INVENTOR
ALFRED G.W. HALL
By Watson, Cole, Grindle & Watson
ATTORNEYS

March 13, 1962 A. G. W. HALL 3,025,193
MOULDING OF BOAT HULLS FROM SYNTHETIC
RESIN BONDED GLASS FIBRES
Filed Feb. 20, 1957 6 Sheets-Sheet 3

Fig.5.

INVENTOR
ALFRED G.W. HALL

By
Watson, Cole, Grindle + Watson
ATTORNEYS

United States Patent Office 3,025,193
Patented Mar. 13, 1962

3,025,193
MOULDING OF BOAT HULLS FROM SYNTHETIC RESIN BONDED GLASS FIBRES
Alfred George William Hall, East Molesey, England, assignor to Watercraft Limited, East Molesey, England, a British company
Filed Feb. 20, 1957, Ser. No. 641,330
Claims priority, application Great Britain Feb. 22, 1956
14 Claims. (Cl. 29—469)

This invention relates to the moulding of boat hulls from synthetic resin bonded glass fibres and has for an object to enable gunwales, coamings and deck portions and other laterally projecting parts to be formed integrally with the sides of the hull.

A known moulding method may be employed which consists in applying to the mould (with or without having first coated it with a separating layer) one or more coatings of a synthetic resin, for example a polyester resin or phenolic resin in a fluid condition i.e. in an unset or uncured or partly set or partly cured condition the exposed coating being arranged to be slow setting or curing so as to give sufficient time for the next operation to be carried out before the completion of setting or curing then laying a layer of glass fibres on the synthetic resin before it gels and applying pressure to it as by a roller, so as to cause the synthetic resin to impregnate the glass fibres, then applying a further slow setting or curing coating of synthetic resin and another layer of glass fibres, and consolidating it by rolling and repeating the process until the required thickness is built up. The setting or curing of the synthetic resin may be effected by including in the resin a suitable catalyst with or without an accelerator so that the setting takes place after a predetermined interval of time with or without the application of heat and pressure. For example in the case of a polyester resin which is required to set or be cured without the application of heat there may be included in the resin a proprietary catalyst known as M.E.K. peroxide comprising methyl ethyl ketone peroxide which is a solution containing 60% active peroxide and an accelerator in the form of cobalt naphthanate. In the case where setting or curing of the polyester resin is effected by the application of heat and pressure there may be included in the resin a catalyst known as benzoyl peroxide. For example, for applying pressure there may be secured to the mould in an air tight manner a flexible sheet which extends over the coated surface of the mould and subjecting the inner surface of the sheet to vacuum so that it is drawn against the coated surface thereby applying pressure or subjecting the outer surface to pressure whereafter the assemblage is heated for example by radiant heat lamps. Instead of applying a layer of glass fibres to the initial coating of resin there may be applied a scrim cloth of glass fibres or cotton into which resin is brushed whereafter layers of glass fibres and resin are applied as set out above.

Heretofore one of the disadvantages of this method of moulding is that it does not permit lateral projections to be formed on the hull due to the difficulty in removing the hull or part of the hull with such projections from the mould.

According to this invention a method of constructing a hull part which is to extend from stem to stern of a boat and having an integral inwardly extending upwardly facing portion, consists in applying separate mats of glass fibres and fluid plastic capable of setting to separate surfaces of a former assemblage shaped to correspond to the shape of said hull part and having transverse faces across which the mats extend to form flanges facing one another at a locality on the former close to the part shaped to correspond to said upwardly facing portion of the hull, stripping said mould portions from the former assemblage when the plastic is set, detachably securing their flanges together, applying a mat of glass fibres and unset plastic to the continuous surface formed by the mould portions, separating the parts of the mould from one another when the plastic is set, and withdrawing the integral moulded hull part.

Other methods of forming a half hull are set out in the following description which is made with reference to the accompanying drawings in which.

Figure 1:
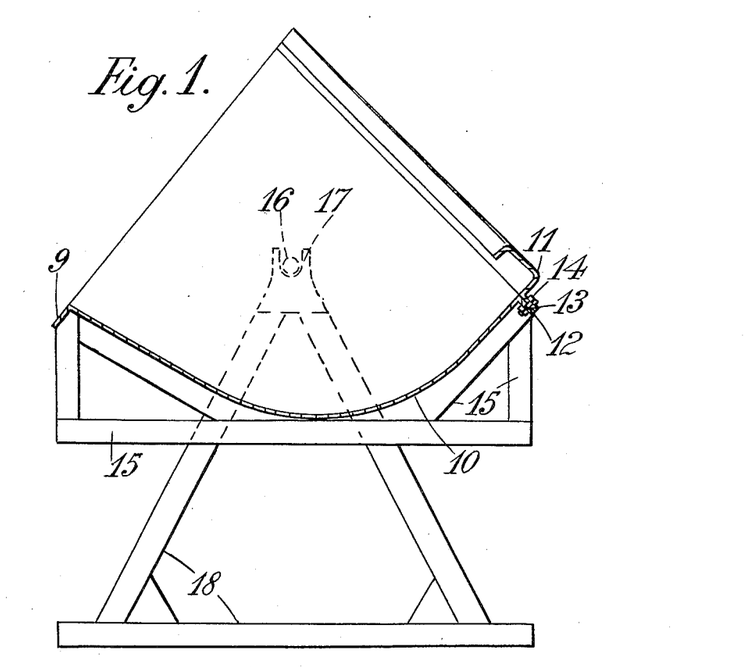
FIGURE 1 is a diagrammatic vertical section through one form of mould suitable for moulding a half hull with an integral gunwale and showing a mounting for the mould.
Figure 2:
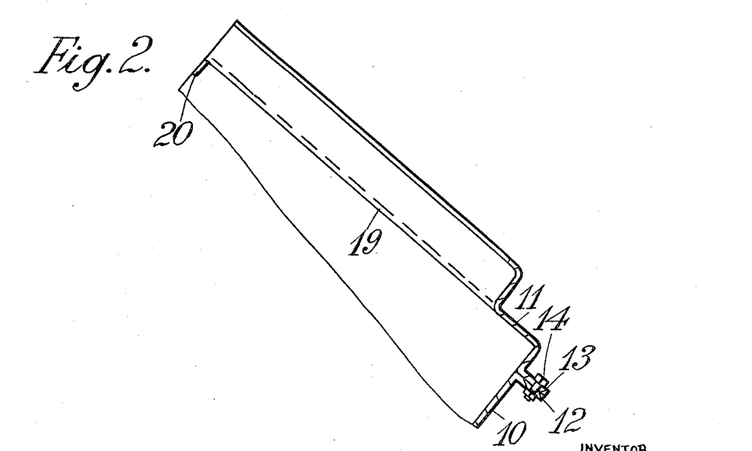
FIGURE 2 shows a cross section through the upper half of a mould having a detachable portion shaped to form a deck part and a coaming.
Figure 3:
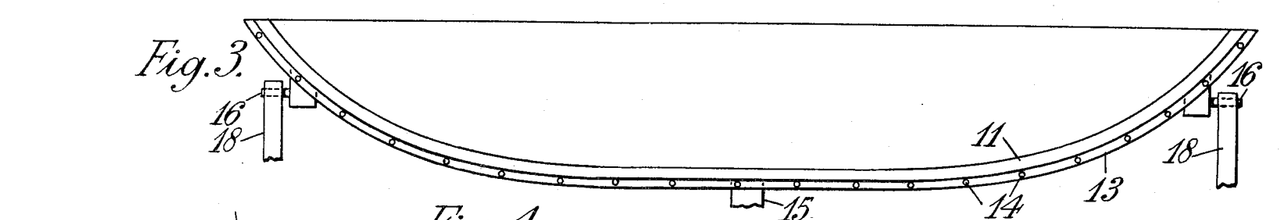
FIGURE 3 is a side elevation of a mould suitable for moulding a half hull in one piece.

The mould shown in FIGURES 1 to 3 is suitable for moulding a half hull in one piece. The mould is formed in two main parts 10 and 11. The inner face of the part 10 is shaped to form the bottom and side of one half of the hull and is provided with an outwardly directed flange 12 along its upper edge and with an outwardly directed flange 9 along its lower edge. The mould is preferably formed from synthetic resin bonded glass fibres but may alternatively be formed from wood or sheet metal. The inner face of the part 11 is shaped to correspond with an inverted U-shaped gunwale and is also provided with an outwardly directed flange 13 which is detachably connected to the flange 12 by bolts 14.

The shell of the mould is supported by a suitable cradle or frame 15 which is provided with trunnions 16 at its ends which engage bearings 17 in a fixed supporting structure 18, whereby the mould may be swung about a fore and aft axis so as to bring various parts of the mould into a convenient position for applying the synthetic resin and glass fibres to its inner surface as previously set out. This assists in carrying out the method described at the commencement of the specification which entails applying layers of glass fibres to the inside of the mould impregnating them with synthetic resin and rolling the applied layers into position. Alternatively the resin is applied, then a scrim cloth, then further resin, then glass fibres and so on. Thus in manipulating the layer which extends around the inner face of the mould part 11 the mould can be swung into a position in which this part is lowermost thereby assisting in the application of the glass layers by rolling.

Alternatively the mould may be supported by a set of rollers with their axes extending in a fore and aft direction and are mounted in a suitable frame which permits the mould to be readily swung about a fore and aft axis.

A preferred form of mould mounting is described below with reference to FIGURE 7. In FIGURE 2 instead of the part 11 being shaped to provide a gunwale it is shaped to provide a coaming extending fore and aft along a part of the length of the hull and provided with forwardly and rearwardly extending portions 19 by means of which a fore and aft deck may be formed integrally with the hull. These portions 19 may be inwardly flanged at 20 and when the two halves are brought together the flanges 20 on one abut those of the other and are clamped together by bolts or rivets. If desired, however, the coaming may extend right up to the stem and stern of the boat.

Figure 5:
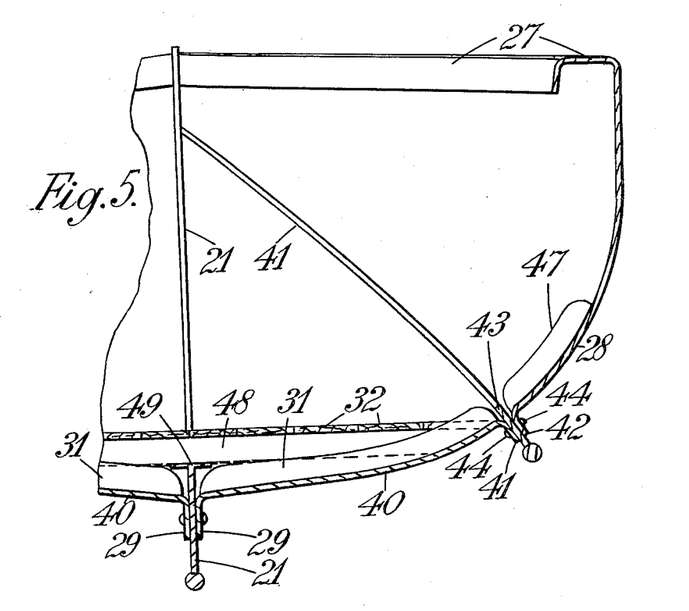
FIGURE 5 is a section through an alternative form of hull and formed in a number of sections which extend the full length of the hull and having a bilge keel on each side of the boat between two of the hull parts.

As previously indicated for a small boat a mould is provided whereby each half hull may be moulded in one piece and the two half hulls assembled with their flanged edges 29 on either side of a keel plate 21 in a similar manner to that shown in FIGURE 5.

Figure 8:
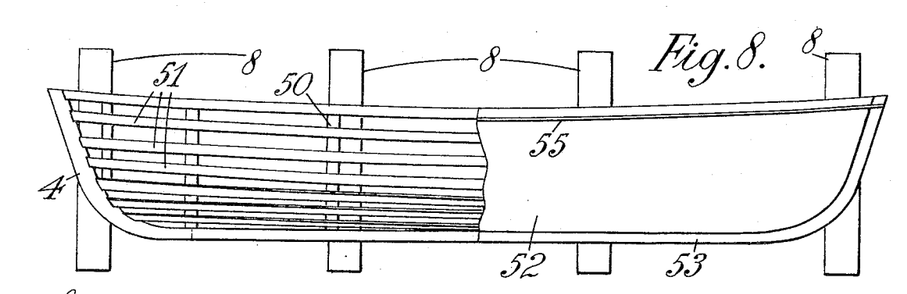
FIGURE 8 is a plan view of a former mounted on trestles for use in constructing a mould such as is shown in FIGURE 1 or FIGURE 2.
Figure 9:
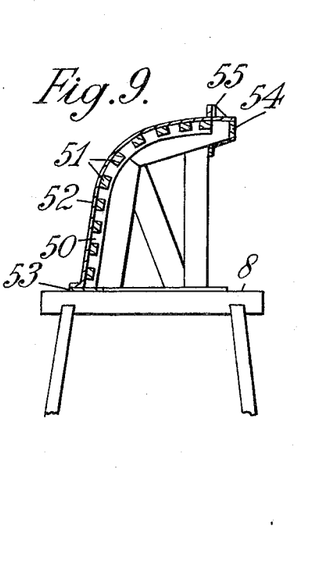
FIGURE 9 is a section through the former.

A former suitable for producing a mould such as is described above is shown in FIGURES 8 and 9. It comprises a number of wood sections 50 which are joined together by a number of stringers 51 which are inset in recesses cut in the outer faces of the sections. The outer contour of these sections are shaped in accordance with the various contours of the outer surface of the hull along the length thereof. Secured to said stringers and to said sections is a plywood covering 52. As will be seen best from FIGURE 8 the margin portion around the former is shaped at 53, by means of a wood strip, to correspond with a flange which is to be formed on the half hull for attachment to the keel whereas the outer face of the upper end of the former is shaped at 54 corresponding to the shape of the gunwale or deck part with or without a coaming. A riband 55 is detachably connected to the outer face of the former and extends from stem to stern at a distance away from the gunwale portion and the depth of this riband corresponds to the width of the flanges 12 and 13 shown in FIGURE 1. The former may be mounted on trestles 8. In forming the mould the outer surfaces of the former are first treated with a separating material and then the synthetic resin and glass fibres are applied to the larger area of the former to one side of the riband 55. When this has set or nearly set the riband 55 is removed and the face of the resulting outstanding flange is treated with a separating material and then the synthetic resin and glass fibres are applied to that part of the former representing the gunwale or the deck part with or without coaming. When this is set the two resulting mould portions 10, 11 are separated from the former and the resulting flanges 12 and 13 are bolted together as best seen in FIGURE 1. In moulding the flanges a V groove may be formed along one and V projections along the other so that the flanges are accurately registered.

Figure 7:
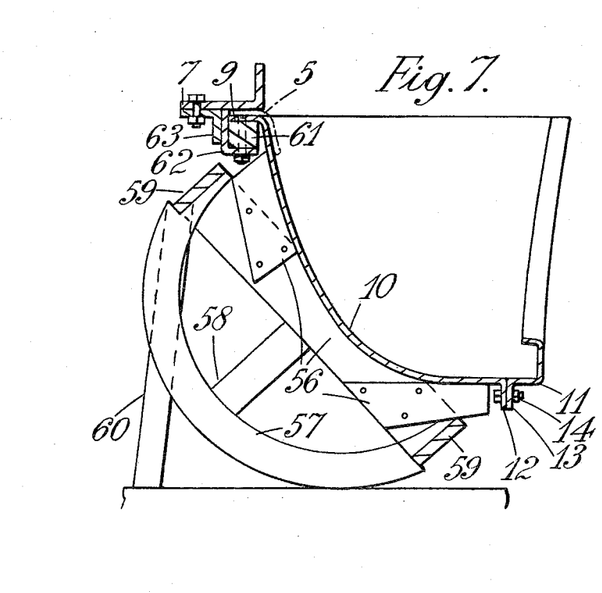
FIGURE 7 is a similar view to FIGURE 1 showing an alternative form of mounting for the mould.

As seen in FIGURE 7 there is secured in the angle between the flange 9 and the outer face of the mould a wood longitudinal member 61 and secured to the outer edge of that member is an angle member 62, a part of which projects beyond the face of the flange 9 to which is attached angle pieces 63 and to this is detachably secured a smoothing shoe 7. The mould is mounted on a frame work such as is seen in FIGURE 1 or FIGURE 7.

In the construction shown in FIGURE 7 a number of cradles 56 support the outer face of the mould and each cradle has attached to it an arcuate member 57. Supporting members 58 extend from each cradle to an arcuate member. The resulting assemblages are secured to one another by longitudinal members 59. The structure may be maintained in either of two positions by removable struts 60 engaging the appropriate longitudinal member 59. The inner face of the mould is treated with a separating material and then synthetic resin and glass fibres are applied to the inner surface so as to extend over the outwardly directed flange 9 (as indicated at 5) on one part of the mould and into the channel section portion 11 representing the gunwale or representing the deck part with or without a coaming. The smoothing shoe 7 is then attached to the angle member 63 so as to smooth off the outer face of the synthetic resin and glass fibres at this location. When the material has set or nearly set the shoe is removed and the two parts of the mould are detached from one another and the part representing the gunwale or deck part with or without a coaming is removed. The moulded half hull can then be lifted out of the main part of the mould. The gunwale 27 or deck part with or without a coaming will thus be formed integrally with the hull.

Figure 4:
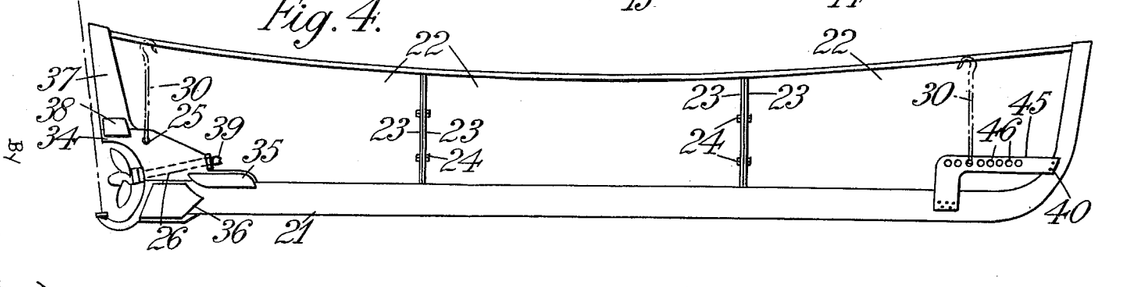
FIGURE 4 is a side elevation of a half hull formed in a number of parts each extending along only a part of the length of the hull and suitable for a motor boat.

For larger boats a number of mould parts may be provided whereby as shown in FIGURE 4 each half hull may be formed with a number of parts 22 arranged end to end provided with upright flanges 23 which are bolted together. The moulds may be prepared by use of a single former in which case detachable ribands will be provided spaced apart at appropriate locations and extending transversely to the length of the former. A somewhat similar technique to that described above is adopted whereby synthetic resin and glass fibres are applied to each area of the outer surface of the former and up the sides of the ribands. When set the mould sections are removed and there are attached to the resulting flange moulding plates which extend to the opposite side of the mould section to the flanges and are of a height to correspond to the height of the flanges to be provided on the hull parts. The mould sections are mounted on separate frames and synthetic resin and glass fibres are applied to their inner faces in a similar manner to that described above; the resulting hull sections may then be bolted together.

Figures 6, 11, 12, 13:
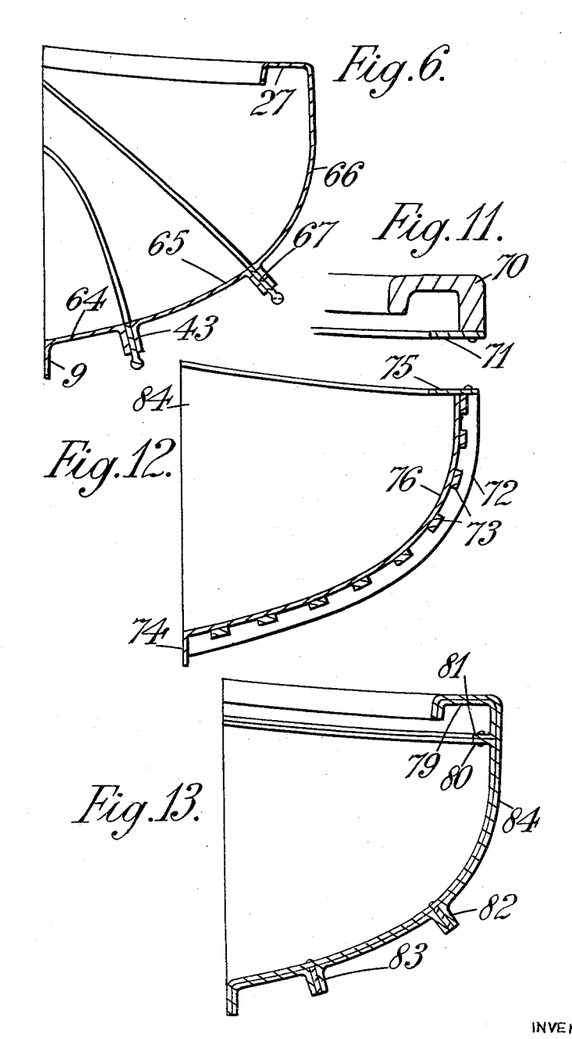
FIGURE 6 is a similar view to FIGURE 5 but of a more diagrammatic character and in which two bilge keels are provided in each half hull.
FIGURE 11 is a section through part of an alternative former in which the synthetic resin and glass fibres are applied to the inner face thereof and which part is for constructing a mould for shaping that part of the hull containing the gunwale.
FIGURE 12 is a section through another part of the former for constructing that part of the mould for forming the greater part of the hull.
FIGURE 13 shows the two parts of the mould fashioned by the two parts of the former shown by FIGURES 11 and 12 and secured together with the synthetic resin and glass fibres and ribands on the outer face thereof.
Figure 10:
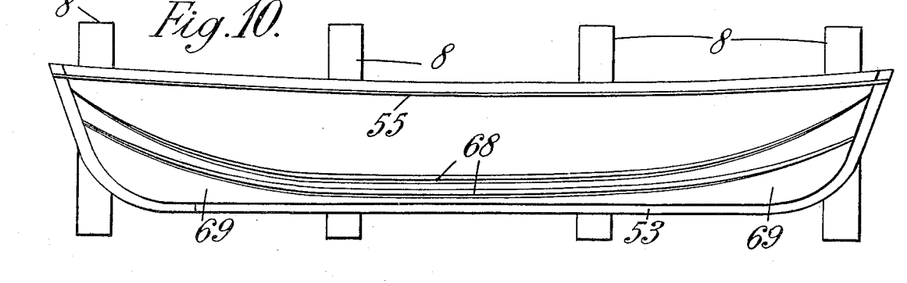
FIGURE 10 is a similar view to FIGURE 8 of a former suitable for constructing a multi-part mould from which a boat as shown in FIGURE 6 is fashioned.

Preferably moulds are provided for moulding the hull in a number of parts extending the full length of the boat. As shown in FIGURE 5 each hull half is formed in two parts 40 and 28 and the two hull halves are secured to the main keel 21. The flanges 29 of the parts 40 are riveted to the main keel 21 while the adjacent flanges 41 and 42 of the parts 28 and 40 abut opposite sides of a stringer 43 which may be in the form of a bilge keel and are riveted thereto by rivets 44. The bilge keel extends from stem to stern and as will be seen terminates a short distance down from the gunwale 27. FIGURE 6 shows a similar arrangement in which each hull half is formed in three parts 64, 65, 66 and is provided with two bilge keels 43 and 67. In the case where each half hull is formed in a number of parts extending along the length of the boat as shown in FIGURES 5 and 6 a single former may be provided from which all the mould parts may be formed as shown in FIGURE 10. In this case in addition to removable riband 55 there is provided one or more ribands 68 which may be permanently secured thereto. The thickness of these ribands is equal to the thickness of a bilge keel to be employed plus twice the thickness of the flanges on the boat hull. Very much the same technique for forming the mould parts on the one former is adopted to that described above. The various parts are coated with a separating material and then synthetic resin and glass fibres are applied to that part 69 of the former including the keel portion 53 and so as to extend up the side face of the lower riband 68. Synthetic resin is then applied to the part of the former between the two ribands and up the sides of those ribands.

Further resin and glass fibres are applied between upper riband 68 and detachable riband 55 and up the sides of those ribands. When this latter resin and glass fibres are set or nearly set the detachable riband 55 is removed, the exposed flange of the synthetic resin bonded glass fibres is then treated with a separating material and further synthetic and glass fibres are applied to the upper part of the former so that they extend from the side face of the riband around that part of the former representing the gunwale or deck part with or without a coaming. The resulting four parts of the mould can then be stripped from the former and the last two mentioned parts are bolted together whereas the other parts remain separate. The two joined parts are then mounted on a frame and are used for moulding a hull part in the manner described above. The other parts of the hull are moulded in the other mould parts.

In the method so far described the synthetic resin and glass fibres are applied to the outer face of the former for producing the mould portions and synthetic resin and glass fibres are applied to the inner face of the resulting moulded portions to produce the hull. The outer face of the former thus requires to be a replica of the outer face of the finished boat. Alternatively, the mould portions may be formed by applying synthetic resin and glass fibres to the inner face of a former which is a replica of the inner face of the finished boat. In such an instance the former requires to be constructed in two parts 84, 70 shown in FIGURES 11 and 12. The inner surface of the part 70 shown in FIGURE 11 corresponds to the shape of the inner surface of the gunwale or deck part with or without a coaming and is provided with a detachable plate 71. The synthetic resin and glass fibre is applied to the interior surfaces of this part of the mould and when set the removable plate is disconnected, and the mould part can then be readily withdrawn.

The other part of the former shown in FIGURE 12 comprises a number of curved wood sections the inner edges of which are shaped in accordance with the contours of the hull along the length thereof and are recessed to receive stringers 73 which space the sections 72 apart and a plywood lining 76 is attached to the sections and stringers. The shape of the inner surface of the lining corresponds to the shape of the inner surface of the finished hull. One end of the former is provided with a transverse face 74 which is used for forming a flange on the mould which in its turn forms a flange on the hull half for attachment to the keel. The other end of the former is provided with a transversely extending detachable plate 75. Synthetic resin and glass fibres are applied to the inner face of this part of the former so as to extend over the transverse face 74 and the inner face of the plate 75 thereby forming flanges along the opposite edges of the resulting mould part. The plate 75 is detached and the mould part removed from the former. The two mould parts 78 and 79 are then secured together by bolts passing through holes in their respective flanges 80, 81 as shown in FIGURE 13. There is then secured to the outer face of the mould a number of ribands 82 and 83 according to the number of bilge keels required and in this case the thickness of these ribands will be equal to the thickness of the bilge keels. After the outer face of the mould has been treated with a separating material the synthetic resin and glass fibres 84 are applied to the various areas on the outer face of the mould bounded by the ribands and when it is desired to withdraw the various parts of the moulded hull the aforesaid bolts securing the flanges 80, 81 are withdrawn, the removable part of the mould drawn away. The various hull sections can then be stripped from the outer face of the mould. The various hull parts are thus formed with flanges which are bolted to opposite sides of the bilge keels to form a half hull as shown in FIGURE 6 and two half hulls thus formed have their marginal flanges bolted to the keel plate.

In any of the arrangements referred to above the boat may be provided with a stern frame 34 (see FIGURE 4) which at the lower end is rigidly secured to the keel 21 by two plates 35, 36, and which at the upper end is secured to a continuation part 37 by a plate 38. In the case of a motor boat the propeller shaft 39 is either arranged to extend through a bearing in the stern frame or to one side thereof. A hole 25 in the stern frame is engageable by a lifting hook 30. At the bow end two curved cleat plates 45 are secured on either side of the keel plate and are provided with holes 46 for engagement by another lifting hook 30. Where the bearing tube has a greater diameter than the thickness of the keel, recesses are moulded in the edges of the half hull portions.

Also in any of the arrangements referred to, at each of a number of spaced locations from stem to stern there are provided cross members formed from synthetic resin bonded glass fibres bonded to the inner surface of the hull. As will be seen from FIGURE 5 one cross member 31 is arranged at each location between the main keel 21 and stringer 43 and another 47 extending above the stringer. Floor boarding 32 may be supported by beams 48 attached to a flange 49 at the upper end of the keel 21.

I claim:

1. A method of constructing a hull part which is to extend from stem to stern of a boat and having an integral inwardly extending upwardly facing portion, which method consists in forming separate mould portions by applying a mat of glass fibres and plastic capable of setting to separate surfaces of a former assemblage shaped to correspond to the shape of said hull part and having transverse faces across which the mats extend to form flanges facing one another at a locality on the former close to the part shaped to correspond to said upwardly facing portion of the hull, stripping said mould portions from the former assemblage when the plastic is set, detachably securing their flanges together, applying a matt of glass fibres and plastic capable of setting to the continuous surface formed by the mould portions, separating the parts of the mould from one another when the plastic is set and withdrawing the integral moulded hull part.

2. A method of constructing a hull part which is to extend from stem to stern of a boat and having an integral inwardly extending upwardly facing portion, which method consists in forming separate mould portions by applying two separate mats of glass fibres and plastic capable of setting side by side to the outer convex surface of a single former which is shaped to correspond to the shape of said hull part and having transverse faces across which the mats extend to form flanges facing one another at a locality close to the part shaped to correspond to the inwardly extending upwardly facing portions, stripping said mould portions from the former when the plastic is set and detachably securing them together applying at least one matt of glass fibres and plastic capable of setting to the inner continuous surface of the mould thus formed and when the plastic is set separating the parts of the mould from one another and withdrawing the integral moulded hull part.

3. A method of constructing a hull part which is to extend from stem to stern of a boat and having an integral inwardly extending upwardly facing portion, which method consists in forming separate mould portions by applying a mat of glass fibres and plastic capable of settting to the outer convex surface of a former assemblage shaped to correspond to the shape of said hull part on one side of a detachable stringer arranged along a line adjacent the part of the former corresponding to the inwardly extending upwardly facing portion to be formed so that the mats extend up one side of the stringer to form a flange, removing the stringer when the plastic is set, applying another matt of glass fibres and plastic capable of setting to the remaining outer surface of the former and to the flange formed on the first said matt, withdrawing the two mould portions thus formed from the former when the plastic is set detachably securing the flanges of the two mould portions together, applying a matt of glass fibres and plastic capable of setting to the continuous concave surface thus formed by the mould parts, separating the mould parts when the plastic is set and withdrawing the integrally moulded hull part therefrom.

4. A method of constructing a hull part which is to extend from stem to stern of a boat and having an integral inwardly extending upwardly facing gunwale of inverted channel section which method consists in forming separate mould portions by applying a mat of glass fibres and plastic capable of setting to the outer convex face of a former shaped to correspond to the shape of said hull part on one side of a removable stringer located adjacent the surface representing the gunwale, which matt extends up a side face of said stringer to form a flange removing said stringer when the plastic is set, applying another matt of glass fibres and plastic capable of setting to the remaining surface of the former so as to extend up said flange and form a second flange, stripping said mould portions from said former, detachably securing together their flanges, applying at least one matt of glass fibres and plastic capable of setting to the continuous concave inner surface of the mould structure, separating the two parts of the mould from one another when the plastic is set and withdrawing the integrally moulded hull part and gunwale.

5. A method of constructing a hull part which is to extend from stem to stern of a boat and having an integral inwardly extending deck portion which method consists in forming separate mould portions by applying a mat of glass fibres and plastic capable of setting to a former assemblage shaped to correspond with the hull part and deck portion on one side of a removable stringer located at a point close to the part of the former representing the deck portion so that said matt extends up one side of the stringer to form a flange, removing the stringer when the plastic is set, applying to the remaining portion of the former another matt of glass fibres and plastic capable of setting, so as to extend up said flange to form a second flange, stripping said mould portions from the former when the plastic is set, detachably securing their flanges together, applying at least one matt of glass fibres and plastic capable of setting to the continuous inner surface of the mould structure, separating the two parts of the mould from one another when the plastic is set and withdrawing the integrally moulded hull part and deck portion.

6. A method of constructing a half hull extending from stem to stern of a boat and having an integral inwardly extending upwardly facing portion which consists in forming separate mould portions by applying two separate mats of glass fibres and plastic capable of setting to two separate surfaces of a former assemblage shaped to correspond to the shape of the half hull and having transverse faces across which the mats extend to form flanges facing one another at a locality on the former representing the inwardly extending upwardly facing portion, stripping said mould portions from the former detachably securing them together, applying a mat of glass fibres and plastic capable of setting to the continuous surface thus formed, separating the parts of the mould from one another when the plastic is set and withdrawing the integrally moulded half hull.

7. A method of constructing a boat having integral inwardly extending upwardly facing portions along the length thereof, which method consists in forming separate mould portions by applying two separate mats of glass fibres and plastic capable of setting to two surfaces of a former assemblage shaped to correspond to the shape of half the hull of the boat extending from stem to stern and having transverse faces across which the mats extend to form flanges facing one another at a locality on the former representing the inwardly extending upwardly facing portion and a flange on one of the mats away from said locality, stripping said mould portions from said former when the plastic is set, detachably securing said adjacent flanges together, applying a matt of glass fibres and plastic to the continuous surface thus formed by the mould parts so as to form a flange along one edge separating the mould parts from one another when the plastic is set and withdrawing the integrally moulded half hull repeating the operation to form a second half hull and clamping the two half hulls together with flanges along said one edge on opposite sides of the keel plate.

8. A method of constructing a boat which consists in forming separate mould portions by applying a number of separate mats of glass fibres and plastic capable of setting to separate surfaces of a former assemblage shaped to correspond to the shape of a half hull extending from stem to stern of the boat and also shaped along one edge to correspond to an inwardly extending upwardly facing portion of the hull which surfaces are provided with a number of stringers extending from stem to stern one of which stringers adjacent the part shaped to correspond with the inwardly extending upwardly facing portion is detachable and the other stringers are fixed, and wherein a matt of glass fibres and plastic capable of setting is applied to that part of the former which corresponds to the inwardly extending upwardly facing part of the hull on one side of said detachable stringer and up the side of the stringer to form a flange, removing the stringer after the plastic is set, applying another matt of glass fibres and plastic between said flange and an adjacent fixed stringer and applying other matts of glass fibres and plastic capable of setting between the other fixed stringers withdrawing the mould parts thus formed from the former when the plastic is set securing that part of the mould representing the inwardly extending upwardly facing part to an adjacent part of the mould applying a matt of glass fibres and plastic capable of setting to the assemblage, separating the two parts of the mould and withdrawing the resulting hull section, applying a matt of glass fibres and plastic capable of setting to each of the other mould parts so as to extend around the flanges thereof, stripping the hull sections from these mould parts when the plastic is set and securing the flanges of adjacent hull sections together, so as to form half a hull and repeating the above steps to form a second half hull and securing the two half hulls together.

9. A method of constructing a boat according to claim 8 wherein bilge keels are secured between the flanges of adjacent hull sections and wherein a keel plate is secured between the flanges on the lower edges of the two half hulls.

10. A method of constructing a hull part which is to extend from stem to stern of a boat and having an inwardly extending upwardly facing portion, which method consists in forming separate mould portions by applying a matt of glass fibres and plastic capable of setting to each of two formers, one of which is shaped to correspond to the shape of the hull part adjacent the inwardly extending upwardly facing portion and the other corresponding to the remaining portion of the hull part whereby two separate flanged mould portions are formed which abut one another along a line adjacent said inwardly extending upwardly facing portion, stripping said mould portions from the formers, detachably securing their flanges together, applying at least one matt of glass fibres and plastic capable of setting to the continuous surface thus formed and separating two parts of the mould from one another and withdrawing the integral moulded hull part.

11. A method according to claim 10 wherein said matt of glass fibres and plastic are applied to the external convex faces of the two former parts and wherein there is applied to the internal concave faces of the mould parts thus formed the matt of fibres and plastic.

12. A method according to claim 7 wherein a keel plate is clamped between the flanges on the lower edges of the two half hulls.

13. A method according to claim 1 and which consists in mounting the mould on a structure so that the mould may be swung about a fore and aft axis, swinging the mould so that one edge is lowermost, applying a mat of glass fibres and fluid plastic capable of setting to the mould surface, rolling the matt into contact with the mould at the location adjacent the lower edge, swinging the mould so as to bring another part of the matt lowermost, rolling that part of the matt, again swinging the mould until another part is lowermost, rolling that part of the surface and so on until the whole surface has been consolidated by rolling.

14. A mould formed from glass fibres bonded with plastic, the inner face of which mould is shaped to correspond to the outer surface of the half hull extending from stem to stern, which mould is provided with a detachable inwardly extending part along one edge thereof, the inner face of which part is shaped to correspond to an inverted channel section gunwale.

References Cited in the file of this patent

UNITED STATES PATENTS

| | | |
|---|---|---|
| 3,974 | Francis | Mar. 26, 1845 |
| 2,340,208 | Skolnik | Jan. 25, 1944 |
| 2,342,023 | Vidal et al. | Feb. 15, 1944 |
| 2,376,753 | Bowen | May 22, 1945 |
| 2,547,146 | Anthony | Apr. 3, 1951 |
| 2,721,341 | Roberts et al. | Oct. 25, 1955 |
| 2,729,268 | Broughton et al. | Jan. 3, 1956 |
| 2,834,971 | Harrison | May 20, 1958 |
| 2,845,379 | Bey | July 29, 1958 |

FOREIGN PATENTS

| | | |
|---|---|---|
| 955,794 | France | July 4, 1949 |

OTHER REFERENCES

Army Sled for the Arctic, Holmes, Modern Plastics, April 1952, pages 115–118. (Photostat copy in Div. 67.)

Plastics Industry, February 1950, pages 26, 27, and 32.